UNITED STATES PATENT OFFICE.

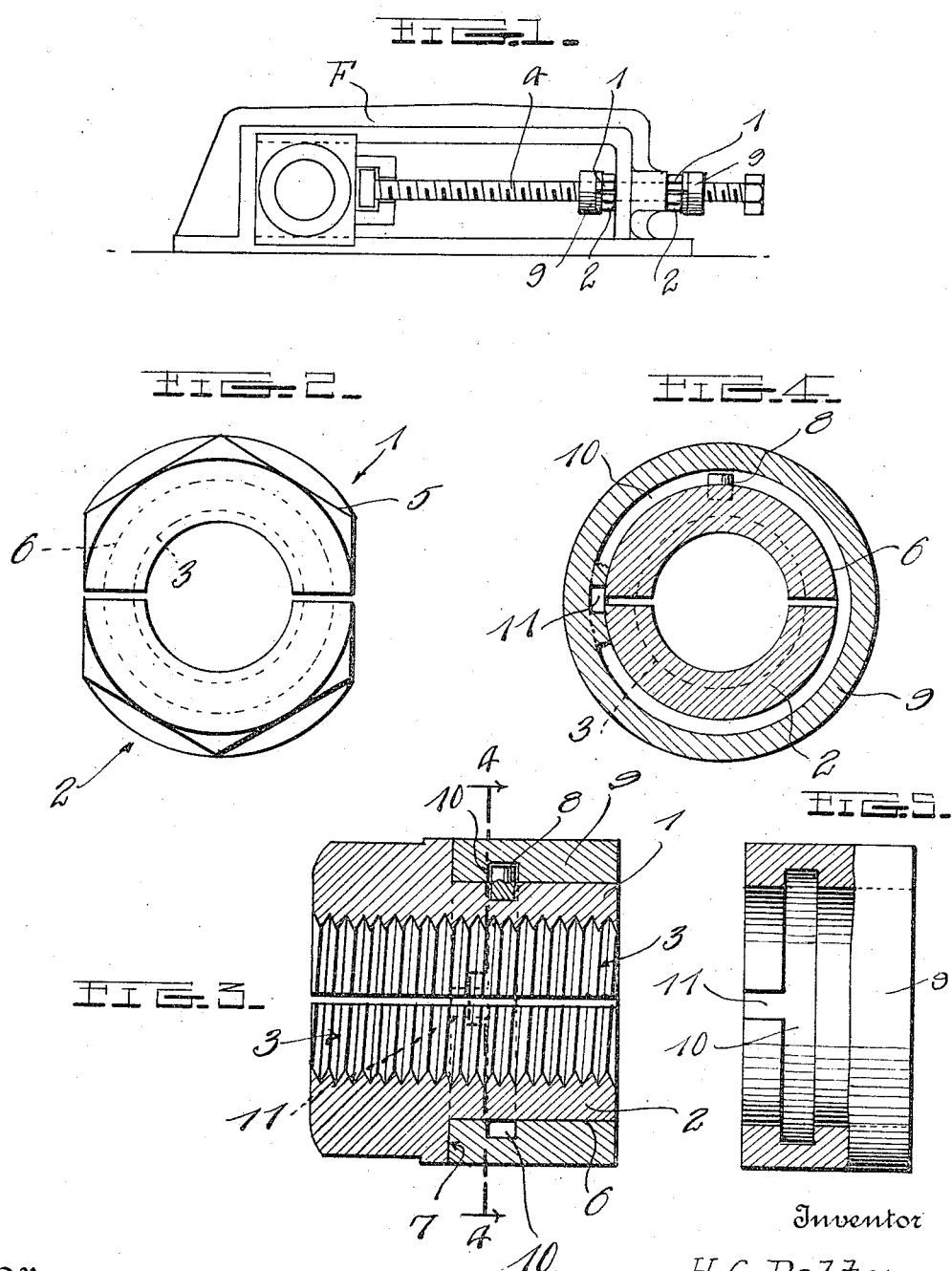

HARRY CLASE PELTZ, OF LANSFORD, PENNSYLVANIA.

SPLIT NUT.

1,241,432.  Specification of Letters Patent.  Patented Sept. 25, 1917.

Application filed November 20, 1916. Serial No. 132,386.

*To all whom it may concern:*

Be it known that I, HARRY C. PELTZ, a citizen of the United States, residing at Lansford, in the county of Carbon and State of Pennsylvania, have invented certain new and useful Improvements in Split Nuts; and I do declare the following to be a full, clear, and exact description of the invention, such as will enable others skilled in the art to which it appertains to make and use the same.

This invention relates to new and useful improvements in locks for split nuts, and the primary object of the invention is to provide an improved split nut adapted to slide freely upon a threaded stem or rod, and which embodies means for securely locking the nut at various positions thereon.

Another object of this invention is to provide a device of this character which is simple and durable in construction, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a side elevation of a take-up frame showing the split nut applied thereto;

Fig. 2 is an end elevation of the nut;

Fig. 3 is a longitudinal section of the nut;

Fig. 4 is a vertical section taken on the line 4—4 of Fig. 3; and

Fig. 5 is a detail section through the locking ring showing the arrangement of the slots.

In describing my invention I shall refer to the drawings in which similar reference characters designate corresponding parts throughout the several views. In the accompanying drawing, I have shown a pair of these nuts applied to a take-up frame F, Fig. 1 showing the position of the nuts on the threaded bolt on both sides of the frame.

The nut is formed of two semi-cylindrical sections 1 and 2, which are internally threaded as shown at 3, the threads being either right or left-handed according to the direction in which it is desired the nut to turn. These two semi-cylindrical sections are adapted to be positioned on opposite sides of the threaded bolt 4 and when so positioned there will be a space left between the adjacent edges of the same as clearly shown in Figs. 2, 3 and 4 of the drawing. Owing to the fact that the nut is formed of these two sections, the same may be quickly positioned on the bolt at any desired point, by merely placing the two parts in opposed position when desired.

One portion of the outer surface of the sections or members has a flat sided head 5 formed thereon adjacent one end, while the other portion of the outer surface is smooth as shown at 6 and slightly reduced to form a shoulder 7 where the inner end of this portion abuts the flat side of the head. The section 1 is provided with a laterally projecting stud 8 for a purpose to be hereinafter fully described.

When the two semi-cylindrical sections 1 and 2 are positioned on the threaded bolt, they are locked thereon by means of a sleeve 9 which is adapted to surround the smooth portion 6 of the outer surface of these sections or members, and to securely hold the same together. This sleeve 9 is provided with an annular recess 10 therein spaced from one edge, and the recess 10 communicates with the end of the sleeve by means of a longitudinal passage 11 that extends from one end to the recess. By this means when it is desired to place the sleeve upon the reduced portion of the nut, the lug 8 is positioned within the recess 11 and the sleeve is slid along the nut until its end abuts against the shoulder 7 of the head portion. When in this position the lug 8 is passed through the recess 11 to the recess 10, whereupon by turning the sleeve, the same will be securely locked on the nut.

From the foregoing description it will be obvious that owing to the fact that the nut is formed of two sections that are detachable, the same may be placed at various positions along the threaded shaft, and when placed at the desired point, in the locking sleeve 9 engages the reduced portion of the nut, the two sections or members will be securely clamped together and the nut may be tightened against the surface against which it is supposed to bear. The annular recess which coacts with the lug 8 securely holds the locking sleeve 9 in position, and prevents the same from becoming disengaged from the reduced portion of the members which it surrounds. As herein illustrated the split nut is shown applied to a take-up frame but it is adapted for numerous uses where it is desired to quickly traverse the threaded bolt.

From the foregoing description of the construction and operation of my improved nut, the manner of applying the same to use, and the operation thereof will be readily understood, and it will be seen that I have provided a simple and efficient device of this character for carrying out the objects of the invention.

I claim:

1. A split nut comprising a plurality of segmental sections threaded internally for engagement with threads on a bolt, an external projection on one of said sections, and a sleeve surrounding said sections to hold them in operative relation, said sleeve having an internal circumferentially extending groove receiving said projection, and a passage leading from said groove through one end of said sleeve.

2. A split nut comprising a pair of semi-cylindrical members internally threaded and adapted to engage a threaded bolt, a head formed on the outer surface of one portion of said members at one end for engagement by a wrench, the remaining outer surface of the members being smooth, a projecting lug on the smooth surface of one of said members, the other of said members being smooth, a locking sleeve adapted to surround the smooth surface of said members to lock the nut on the bolt, said sleeve having a continuous annular recess in its inner surface and said inner surface of the sleeve being provided with a longitudinal guide passage extending from one end to the annular recess for positioning the lug in the recess when the sleeve is placed on the nut.

In testimony whereof I have hereunto set my hand in the presence of two subscribing witnesses.

HARRY CLASE PELTZ.

Witnesses:
WM. F. EARLEY,
JAMES R. HALL.

Copies of this patent may be obtained for five cents each, by addressing the "Commissioner of Patents, Washington, D. C."